United States Patent
Li et al.

(10) Patent No.: US 10,063,493 B2
(45) Date of Patent: Aug. 28, 2018

(54) APPLICATION-BASED ELASTIC RESOURCE PROVISIONING IN DISAGGREGATED COMPUTING SYSTEMS

(71) Applicant: INTERNATIONAL BUSINESS MACHINES CORPORATION, Armonk, NY (US)

(72) Inventors: Min Li, San Jose, CA (US); John A. Bivens, Ossining, NY (US); Ruchi Mahindru, Elmsford, NY (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 15/155,560

(22) Filed: May 16, 2016

(65) Prior Publication Data
US 2017/0331763 A1    Nov. 16, 2017

(51) Int. Cl.
| | |
|---|---|
| G06F 15/16 | (2006.01) |
| G06F 15/173 | (2006.01) |
| H04L 12/927 | (2013.01) |
| H04L 12/851 | (2013.01) |
| H04L 29/08 | (2006.01) |

(52) U.S. Cl.
CPC ........ *H04L 47/803* (2013.01); *H04L 47/2425* (2013.01); *H04L 47/805* (2013.01); *H04L 67/1012* (2013.01); *H04L 67/1023* (2013.01)

(58) Field of Classification Search
CPC ............... H04L 67/1012; H04L 47/805; H04L 67/1023
USPC ........................................ 709/224, 231, 232
See application file for complete search history.

(56) References Cited

U.S. PATENT DOCUMENTS

| | | | |
|---|---|---|---|
| 8,775,601 B2 | 7/2014 | O'Sullivan et al. | |
| 9,491,112 B1* | 11/2016 | Patel | ........................ H04L 47/70 |
| 2002/0152305 A1* | 10/2002 | Jackson | .............. H04L 41/5035 709/224 |
| 2005/0222885 A1* | 10/2005 | Chen | ........................ G06F 9/50 703/13 |

(Continued)

OTHER PUBLICATIONS

IBM, "Method of creating a componentized architecture for unifying resource sharing scenarios in Cloud Computing environment," An IP.com Prior Art Database Technical Disclosure, IP.com No. 000193146, Feb. 11, 2010 (14 pages).

(Continued)

*Primary Examiner* — Karen Tang
(74) *Attorney, Agent, or Firm* — Griffiths & Seaton PLLC (57) ABSTRACT

Various embodiments for elastic resource provisioning in a disaggregated cloud computing environment, by a processor device, are provided. Respective members of pools of hardware resources within the disaggregated cloud computing environment are provisioned to a tenant according to an application-level service level agreement (SLA). Upon detecting a potential violation of the application-level SLA, additional respective members of the pools of hardware resources are provisioned on a component level to the tenant to avoid a violation of the SLA by one of a scale-up process and a scale-out process.

18 Claims, 4 Drawing Sheets

(56) References Cited

U.S. PATENT DOCUMENTS

| | | | |
|---|---|---|---|
| 2006/0293942 A1* | 12/2006 | Chaddha | G06Q 10/06 |
| | | | 705/7.12 |
| 2008/0240150 A1* | 10/2008 | Dias | H04L 41/5003 |
| | | | 370/465 |
| 2008/0270199 A1* | 10/2008 | Chess | G06F 9/505 |
| | | | 705/7.26 |
| 2012/0054771 A1* | 3/2012 | Krishnamurthy | G06F 9/4881 |
| | | | 718/105 |
| 2013/0103215 A1 | 4/2013 | Dai et al. | |
| 2014/0129744 A1* | 5/2014 | Muppirala | H04L 47/6275 |
| | | | 710/39 |
| 2014/0130055 A1* | 5/2014 | Guha | G06F 3/0604 |
| | | | 718/104 |
| 2015/0263894 A1* | 9/2015 | Kasturi | H04L 41/0806 |
| | | | 709/222 |

OTHER PUBLICATIONS

Anonymous, "Autonomic provisioning engine and policy management in the Tivoli Workload Scheduler," An IP.com Prior Art Database Technical Disclosure, IP.com No. 000233896 (4 pages).

* cited by examiner

APPLICATION-BASED ELASTIC RESOURCE PROVISIONING IN DISAGGREGATED COMPUTING SYSTEMS

BACKGROUND OF THE INVENTION

Field of the Invention

The present invention relates generally to large scale computing, and more particularly to pooling and dynamically distributing hardware resources for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects.

SUMMARY OF THE INVENTION

Various embodiments for elastic resource provisioning in a disaggregated cloud computing environment, by a processor device, are provided. Respective members of pools of hardware resources within the disaggregated cloud computing environment are provisioned to a tenant according to an application-level service level agreement (SLA). Upon detecting a potential violation of the application-level SLA, additional respective members of the pools of hardware resources are provisioned on a component level to the tenant to avoid a violation of the SLA by one of a scale-up process and a scale-out process.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing resources are usually pre-configured by vendors at fixed levels of configurations. One aspect is that each individual computing resource, such as memory size, number of CPUs, disk size, etc. has a limited boundary. Another aspect is that each computing platform has a limited number of physical customization options. Today's workloads are running under these limitations, which subsequently is a reason that techniques such as memory swapping and caching optimization are used in computing environments.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, a VM cannot change its base resources, such as adding memory or adding virtual CPUs. This is because such a VM shares the hardware resources of a fixed pre-built server enclosure with other VMs, and it may not be possible to displace other users to make room for the resource expansion of the first user. While such is possible in principle (e.g. by migrating other users (live VM migration) to other servers), such an operation would create an abundant increase in traffic and require an overload on a datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Programming Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

In view of the forgoing, disaggregated computing systems provide flexibility and elasticity in constructing bare-metal computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload.

Within these disaggregated systems, application-level service level agreements (SLAs) may be employed to dynamically provision or de-provision the hardware resources on-demand, and ensure that a tenant is receiving the computing service they have purchased, while retaining an overall cost and performance efficiency model for both the cloud service provider and the tenant.

Figure 1:
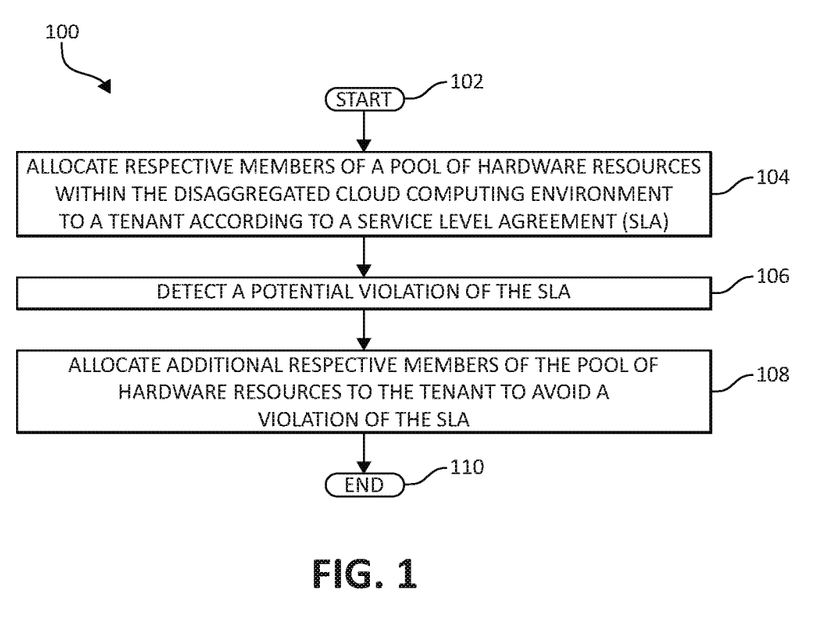
FIG. 1 is a flow chart diagram illustrating a method for elastic resource provisioning in a disaggregated cloud computing environment in accordance with various aspects of the present invention.

FIG. 1 illustrates a method 100 for elastic resource provisioning in a disaggregated cloud computing environment, in accordance with one embodiment of the present invention. The method 100 may be performed in accordance with the present invention in any of the environments depicted in FIGS. 2 and 3 described infra, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 102), respective members of a pool of hardware resources within the disaggregated cloud computing environment are provisioned to a tenant according to an application-level service level agreement (SLA) (step 104). Upon detecting a potential violation of the application-level SLA (step 106), additional respective members of the pool of hardware resources are provisioned on a component level to the tenant to avoid a violation of the SLA by one of a scale-up process and a scale-out process (step 108). The method ends (step 110).

Figure 2:
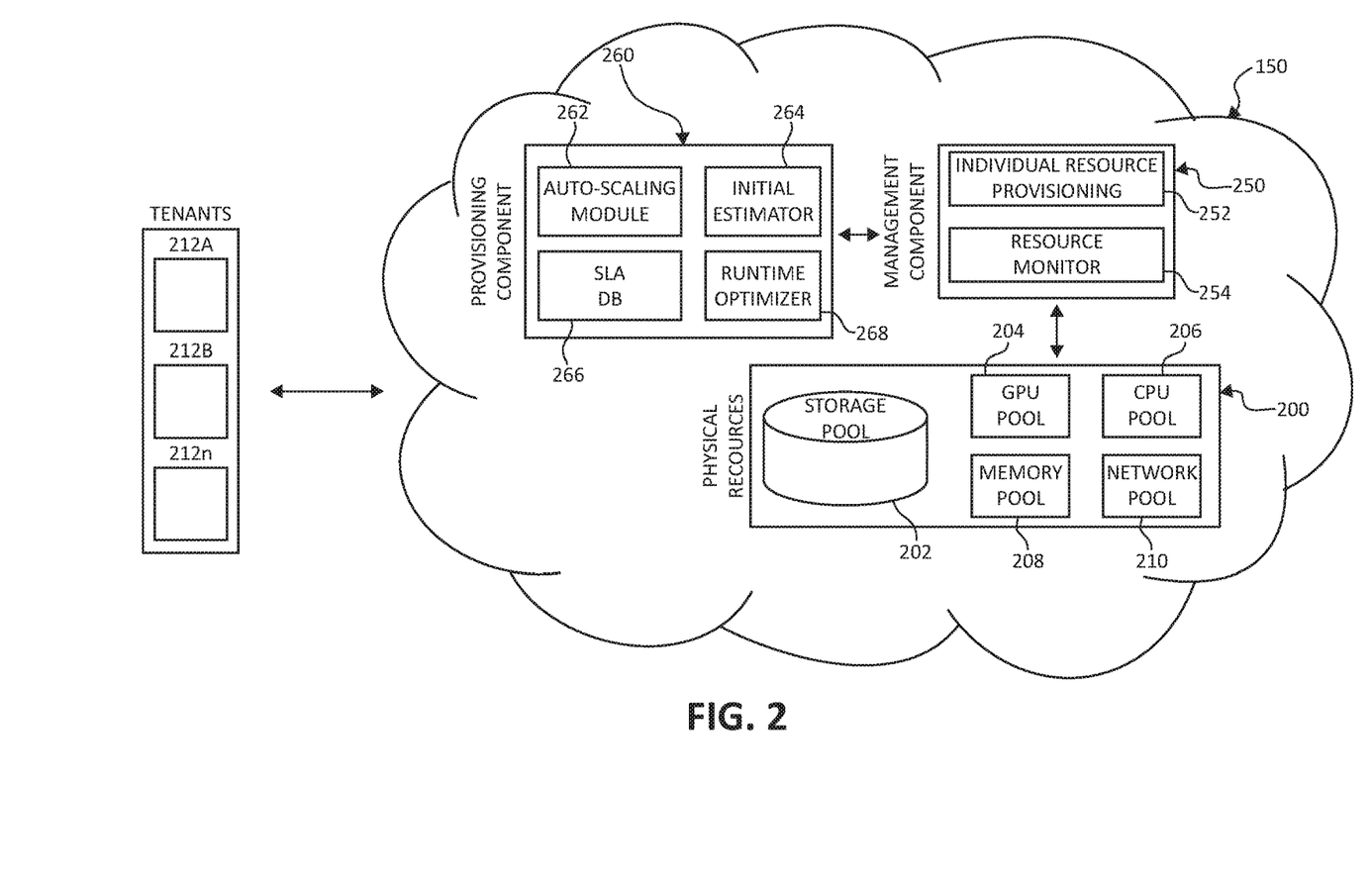
FIG. 2 is a block diagram showing a hardware structure of a disaggregated computing environment, in which aspects of the present invention may be realized.

Advancing to FIG. 2, a block diagram of a disaggregated computing environment is illustrated, including cloud environment 150. Within cloud environment 150 is the disaggregated computing system comprising physical hardware resources 200. Physical hardware resources 200 may comprise of classifications of the hardware resources such as a storage device pool 202, a Graphics Processing Unit (GPU) device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254. The management module 250 is in communication with a provisioning component 260. The provisioning component 260 may include such systems as an auto-scaling module 262, an initial estimator module 264, a SLA database 266, and a runtime optimizer 268, each described herein.

In communication with the cloud environment 150, the management module 250, the provisioning component 260, and the physical hardware resources 200, are tenants 212A, 212B, and 212n. Tenants 212A, 212B, and 212n may communicate with the cloud environment 150 by way of the provisioning component 260, the management module 250, and thus the physical resources 200 provided by any signal-bearing medium.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, while staying in spirit and scope of the present invention. Additionally, the management module 250 and the provisioning component 260 may physically comprise of separate entities, or may be combined into one entity. Furthermore, the duties of the management module 250 and the provisioning component 260, and thus the components therein, may be performed and comprised of physical components, computer code, or a combination of such.

In one embodiment, the management module 250 and the provisioning component 260 interact with individual tenants to receive workload requests and locate the best suitable hardware resources for the given workload. Individual hardware resources are tracked and a mapping is maintained between each respective tenant and assigned hardware resource. Each hardware resource is identified using a unique identifier. This identifier may be a physical identifier (e.g. barcode) and/or a virtual identifier (e.g. code based). The management module 250, the provisioning component 260, a combination thereof, or any other suitable modules or means known in the art may be used to accomplish these mechanisms.

Various application-level SLA APIs may be used to request and define workload characteristics. In some embodiments, a throughput value, a latency value, and a deadline value may be specified when providing an API request for a given workload by a tenant 212A-n. The throughput value specifies a minimum and maximum throughput for a given application, being advantageous for batch processing workloads such as data analytics workloads. The latency value, here again predefined by a user, specifies a minimum and maximum latency observed by the given application, being advantageous for workloads such as interactive queries, web searches, and memory cache systems. The deadline value may be specified as a timeframe when the submitted workload should complete, and may be advantageous for data analytics or batch processing workloads. The aforementioned APIs may be formulated as follows:

---
SLA_TYPE{throughput, latency, deadline}
defineSLA{SLA_TYPE,{minVal, maxVal}}
---

Figure 3:
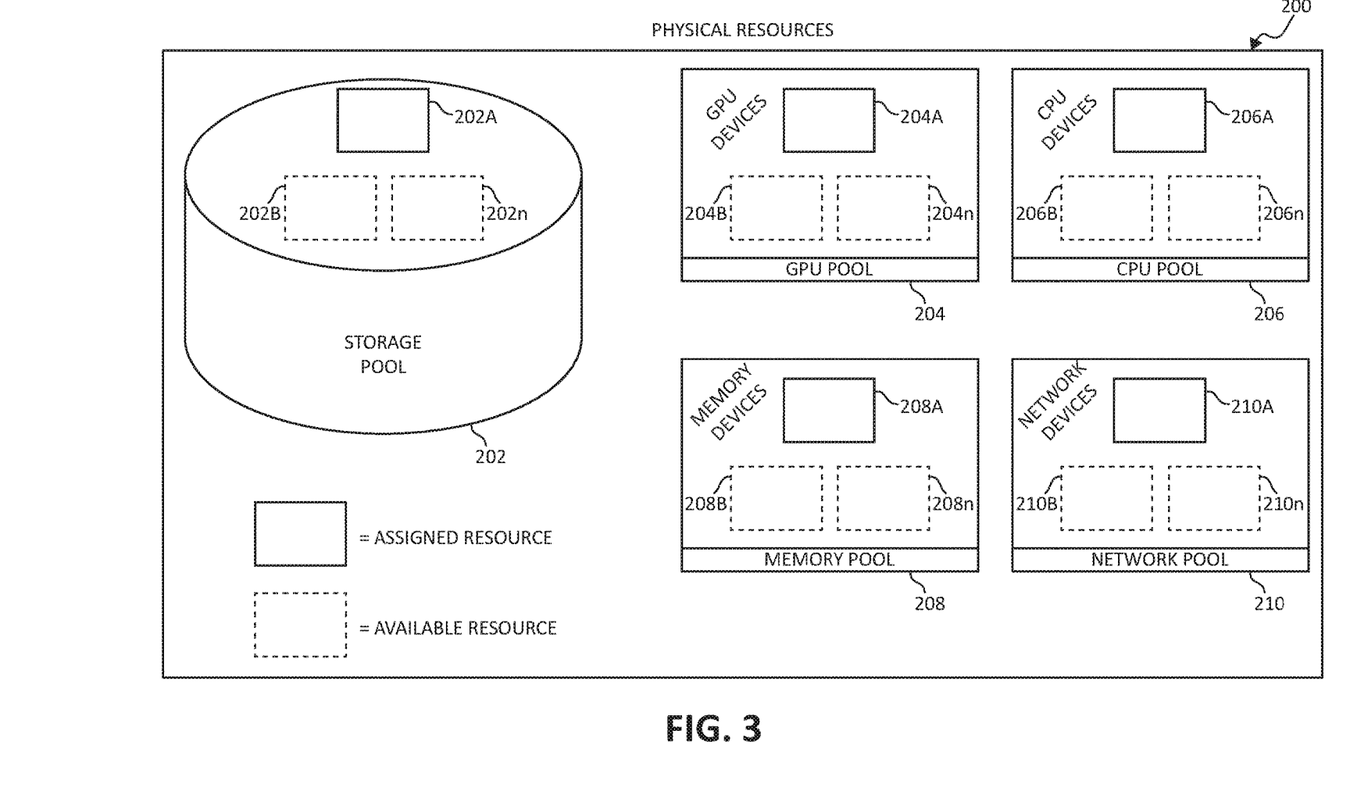
FIG. 3 is an additional block diagram showing a hardware structure of a disaggregated computing environment, in which aspects of the present invention may be realized.

FIG. 3 is a block diagram illustrating the physical hardware resources 200 portion of FIG. 2. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) is assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

In one embodiment, the initial estimator module 264 may initially recommend to a user an estimated quantity of respective hardware resources 200 needed for a given application. This estimation may be provided by the initial estimator module 264 based upon experience of prior runs of the specific application, and/or upon scanning of the code or short runs. For example, the initial estimator module 264 may send a request to the individual resource provisioning component 252 to allocate ten VMs, each with nGB memory and n processor cores for a given workload with a SLA deadline to complete within n hours.

In some embodiments, the runtime optimizer 268 receives monitored information from the resource monitor 254 which provide system metrics for a given tenant 212A-n. Examples of system metrics may include task progress rate; and CPU, memory, disk, and input/output (I/O) utilization. The runtime optimizer 268 sends the monitored information to the auto-scaling module 262.

The auto-scaling module 262 retrieves the SLA for a given tenant 212A-n from the SLA database 266. The SLA database 266 stores workload characteristics and SLA requirements for each tenant 212A-n. With the received system metrics from the runtime optimizer 268, the auto-scaling module 262 compares the monitored information providing the system metrics for the given tenant 212A-n with the SLA requirements obtained from the SLA database 266. If a predetermined threshold is reached based upon the system metrics (i.e. the SLA is detected to be violated by the service provider), additional respective hardware resources 200 (e.g. CPU, memory) are provisioned or de-provisioned to the given tenant 212A-n dynamically, as will be discussed. Additionally, currently provisioned respective hardware resources 200 may be de-provisioned from the given tenant 212A-n when the resources are underutilized, as will be discussed.

Figure 4:
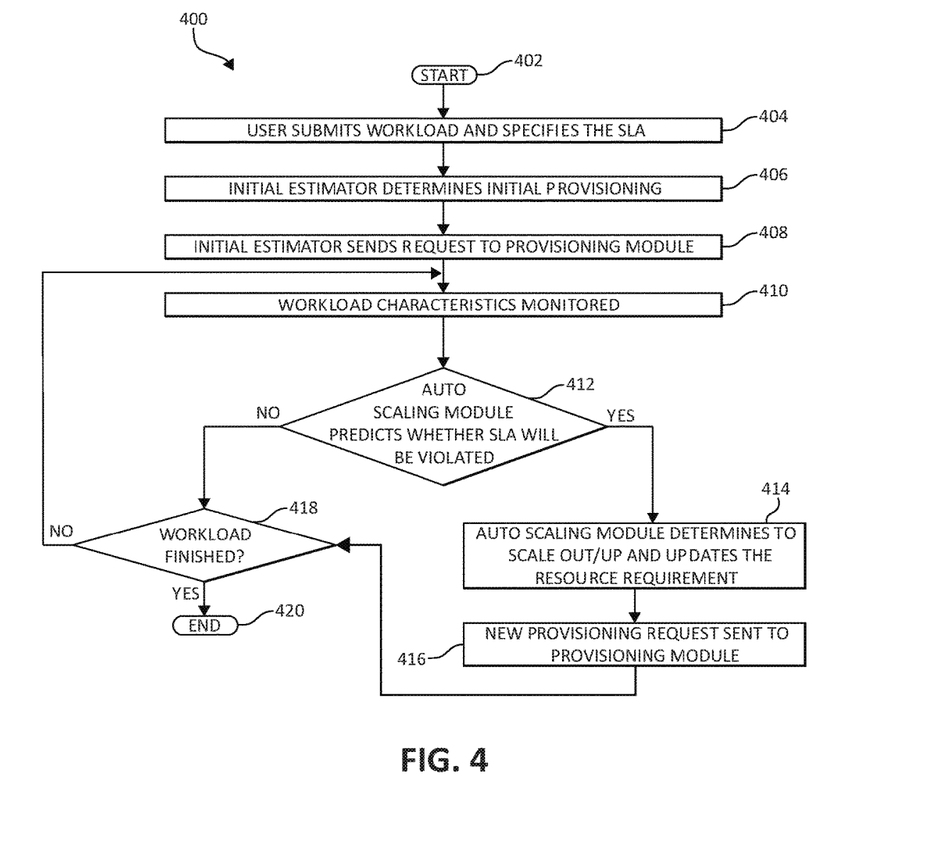
FIG. 4 is an additional flow chart diagram illustrating a method for elastic resource provisioning in a disaggregated cloud computing environment in accordance with various aspects of the present invention.

FIG. 4 illustrates a method 400 for elastic resource provisioning in a disaggregated cloud computing environment. The method 400 may be performed in accordance with the present invention in any of the environments depicted in FIGS. 2 and 3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 400 begins (step 402) when a user (tenant) submits a request for hosting a targeted workload, and specifies the SLA (step 404). The SLA is stored in the SLA database 266. Examples of SLAs are the maximum latency of request for the workload, an average job execution time, a deadline for batch workloads, and the throughput of processing.

The initial estimator module 264 determines the initial provisioning requirement of hardware resources 200 based upon an understanding of the given workload and specified SLA (step 406). The initial estimator module 264 may determine the initial provisioning requirement by searching for prior application runs or scanning code as aforementioned. The initial estimator module 264 then sends the provisioning request for hardware resources 200 to the individual resource provisioning component 252 (step 408).

Runtime optimizer 268 continuously monitors the runtime statistics and system metrics of the workload and communicates with the auto-scaling module 262 (step 410). The auto-scaling module 262 predicts whether the SLA will be violated under the current provisioned resources using predictable resource utilization patterns (step 412). If the SLA is not predicted to be violated, a determination is made as to whether the workload has completed (step 418). If the workload is not completed, the method 400 returns to monitoring workload characteristics (step 410), and oppositely, if the workload has completed at step 418, the method ends (step 420).

Returning to step 412, if the auto-scaling module 262 predicts that under the current provisioned resources, the SLA will be violated, an auto-scaling action is triggered for corresponding needed resources (step 414). The auto-scaling module 262 determines whether to initiate a scale-up or a scale-out process. Whether to perform a scale-up versus a scale-out process is a critical decision within a disaggregated system due to the nature of the architecture, because the disaggregated system allows change to the hardware configurations of bare-metal components without shutting down the system or applications.

A scale-up process comprises allocating additional available quantities of physical hardware resources 200 to the respective tenant 212A-n. For example, a first computing system is dynamically constructed using various ones of the physical hardware resources 200. During a scale-up process (vertical scaling), additional available ones of the physical hardware resources 200 such as processors, memory resources, graphical resources, or accelerators, may be dynamically allocated to the existing first computing system on-demand, depending on the type of resources necessitated for performing the workload efficiently. A scale-out process (horizontal scaling) is distinguished by allocating a broader set of resources on an assembled second computing system which dynamically share the workload of the first computing system, such as a clustered arrangement sharing a given workload between individual components of multiple assembled nodes.

Preferably, a scale-up process is performed until it is no longer practical to provision additional resources to an existing system. The scale-up process is used for scale-up friendly workloads which may comprise compute-intensive workloads such as database server workloads of computationally-intensive multithreaded applications. The scale-out process is used for scale-out friendly workloads which may comprise less computationally-intensive workloads that require less sharing of data structures, and is based upon allocating CPU interconnect bandwidth and less off-chip memory bandwidth. Scale-up friendly workloads refer to workloads which run faster and more efficient by scaling-up additional quantities of the physical hardware resources 200 rather than scaling-out workloads between resources on multiple machines. Here again, in either process, the respective physical hardware resources 200 are provisioned to a respective tenant 212A-n on a component level, by allocating resources on a granular level comprising CPU sockets, memory chips, GPU's, and accelerators, for example.

Additionally, a user (tenant 212A-n) may be prompted to undergo a scale-in or a scale-down process when existing provisioned members of the physical hardware resources 200 are being underutilized. Conversely from the scale-out or scale-up process, the scale-in and scale-down processes comprise de-provisioning certain underutilized components of the physical hardware resources 200 from the given tenant 212A-n. The tenant 212A-n may be inquired to de-provision resources to optimize workload efficiency and operating cost by minimizing unnecessary provisioned physical hardware resources 200 performing a given workload. For example, if the given tenant 212A-n has provisioned to it CPU devices 206A and 206B, yet only requires one of the two devices to perform a requested workload, the tenant 212A-n may be prompted to de-provision (scale-down) CPU device 206B in order to improve a cost efficiency.

Returning to the method 400, step 414, once the auto-scaling module 262 determines whether to perform a scale-up process or a scale-out process, the auto-scaling module 262 then sends the new provisioning request for hardware resources 200 to the individual resource provisioning component 252 (step 416). If the workload is then determined not to be completed (step 418), the method 400 returns to monitoring workload characteristics (step 410), and conversely, if the workload has completed at step 418, the method ends (step 420).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for elastic resource provisioning in a disaggregated cloud computing environment, by a processor device, comprising:

provisioning respective members of pools of hardware resources within the disaggregated cloud computing environment to a tenant according to an application-level service level agreement (SLA); and upon detecting a potential violation of the application-level SLA, provisioning additional respective members of the pools of hardware resources on a component level to the tenant to avoid a violation of the SLA by each of a scale-up process and a scale-out process based upon workload characteristics to ensure a tenant receives a service-level as specified within the SLA while retaining an overall cost and performance efficiency model utilized in the disaggregated cloud computing environment; wherein:

the scale-up process is used for scale-up friendly workloads, and comprises provisioning the additional respective members of the pools of hardware resources according to a quantity of the respective members of the pools of hardware resources; and the scale-out process is used scale-out friendly workloads, and comprises provisioning the additional respective members of the pools of hardware resources according to a CPU interconnect bandwidth and off-chip memory bandwidth between the respective members of the pool of hardware resources.

2. The method of claim 1, further including de-provisioning respective members of the pools of hardware resources to the tenant according to one of a scale-down process and a scale-in process, based upon the workload characteristics.

3. The method of claim 2, wherein the scale-down process and the scale-in process are used upon detecting an under-utilization of the provisioned respective members of the pools of hardware resources, and each comprise prompting the tenant to de-provision certain respective members of the pools of hardware resources to reduce an operating cost.

4. The method of claim 2, wherein detecting the potential violation of the application-level SLA comprises monitoring the workload characteristics of the tenant, the tenant specifying the application-level SLA upon request to perform the workload.

5. The method of claim 1, wherein the provisioning is based upon history information maintained in an SLA database and a predicted performance of a given application from the tenant.

6. The method of claim 1, wherein the respective members of the pools of hardware resources include at least processors, memory devices, graphical processing units (GPUs), and accelerators; and provisioning the additional respective members of the pools of hardware resources on the component level to the tenant comprises allocating individual ones of the processors, the memory devices, the GPUs, and the accelerators to the tenant.

7. A system for elastic resource provisioning in a disaggregated cloud computing environment, the system comprising:

at least one processor device, wherein the at least one processor device:

provisions respective members of pools of hardware resources within the disaggregated cloud computing environment to a tenant according to an application-level service level agreement (SLA); and upon detecting a potential violation of the application-level SLA, provisions additional respective members of the pools of hardware resources on a component level to the tenant to avoid a violation of the SLA by each of a scale-up process and a scale-out process based upon workload characteristics to ensure a tenant receives a service-level as specified within the SLA while retaining an overall cost and performance efficiency model utilized in the disaggregated cloud computing environment; wherein:

the scale-up process is used for scale-up friendly workloads, and comprises provisioning the additional respective members of the pools of hardware resources according to a quantity of the respective members of the pools of hardware resources; and the scale-out process is used scale-out friendly workloads, and comprises provisioning the additional respective members of the pools of hardware resources according to a CPU interconnect bandwidth and off-chip memory bandwidth between the respective members of the pool of hardware resources.

8. The system of claim 7, wherein the at least one processor device de-provisions respective members of the pools of hardware resources to the tenant according to one of a scale-down process and a scale-in process, based upon the workload characteristics.

9. The system of claim 8, wherein the scale-down process and the scale-in process are used upon detecting an under-utilization of the provisioned respective members of the pools of hardware resources, and each comprise prompting the tenant to de-provision certain respective members of the pools of hardware resources to reduce an operating cost.

10. The system of claim 8, wherein detecting the potential violation of the application-level SLA comprises monitoring the workload characteristics of the tenant, the tenant specifying the application-level SLA upon request to perform the workload.

11. The system of claim 7, wherein the provisioning is based upon history information maintained in an SLA database and a predicted performance of a given application from the tenant.

12. The system of claim 7, wherein the respective members of the pools of hardware resources include at least processors, memory devices, graphical processing units (GPUs), and accelerators; and provisioning the additional respective members of the pools of hardware resources on the component level to the tenant comprises allocating individual ones of the processors, the memory devices, the GPUs, and the accelerators to the tenant.

13. A computer program product for elastic resource provisioning in a disaggregated cloud computing environment by at least one processor device, the computer program product embodied on a non-transitory computer-readable storage medium having computer-readable program code portions stored therein, the computer-readable program code portions comprising:

an executable portion that provisions respective members of pools of hardware resources within the disaggregated cloud computing environment to a tenant according to an application-level service level agreement (SLA); and an executable portion that, upon detecting a potential violation of the application-level SLA, provisions additional respective members of the pools of hardware resources on a component level to the tenant to avoid a violation of the SLA by each of a scale-up process and a scale-out process based upon workload characteristics to ensure a tenant receives a service-level as specified within the SLA while retaining an overall cost and performance efficiency model utilized in the disaggregated cloud computing environment; wherein:

the scale-up process is used for scale-up friendly workloads, and comprises provisioning the additional respective members of the pools of hardware resources according to a quantity of the respective members of the pools of hardware resources; and the scale-out process is used scale-out friendly workloads, and comprises provisioning the additional respective members of the pools of hardware resources according to a CPU interconnect bandwidth and off-chip memory bandwidth between the respective members of the pool of hardware resources.

14. The computer program product of claim 13, further including an executable portion that de-provisions respective members of the pools of hardware resources to the tenant according to one of a scale-down process and a scale-in process, based upon the workload characteristics.

15. The computer program product of claim 14, wherein the scale-down process and the scale-in process are used upon detecting an underutilization of the provisioned respective members of the pools of hardware resources, and each comprise prompting the tenant to de-provision certain respective members of the pools of hardware resources to reduce an operating cost.

16. The computer program product of claim 14, wherein detecting the potential violation of the application-level SLA comprises monitoring the workload characteristics of the tenant, the tenant specifying the application-level SLA upon request to perform the workload.

17. The computer program product of claim 13, wherein the provisioning is based upon history information maintained in an SLA database and a predicted performance of a given application from the tenant.

18. The computer program product of claim 13, wherein the respective members of the pools of hardware resources include at least processors, memory devices, graphical processing units (GPUs), and accelerators; and provisioning the additional respective members of the pools of hardware resources on the component level to the tenant comprises allocating individual ones of the processors, the memory devices, the GPUs, and the accelerators to the tenant.

* * * * *